(12) United States Patent
Park et al.

(10) Patent No.: US 9,075,520 B2
(45) Date of Patent: Jul. 7, 2015

(54) APPARATUS AND METHOD FOR REPRESENTING AN IMAGE IN A PORTABLE TERMINAL

(71) Applicant: Samsung Electronics Co., Ltd., Gyeonggi-do (KR)

(72) Inventors: Hyunmi Park, Seoul (KR); Sanghyuk Koh, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 231 days.

(21) Appl. No.: 13/658,918

(22) Filed: Oct. 24, 2012

(65) Prior Publication Data

US 2013/0117025 A1 May 9, 2013

(30) Foreign Application Priority Data

Nov. 8, 2011 (KR) .................. 10-2011-0115776

(51) Int. Cl.
G10L 13/04 (2013.01)
G06F 3/0488 (2013.01)
G06K 9/00 (2006.01)
G06K 9/20 (2006.01)
G06F 3/16 (2006.01)

(52) U.S. Cl.
CPC ............... *G06F 3/0488* (2013.01); *G06F 3/16* (2013.01); *G06K 9/00704* (2013.01); *G06K 9/2081* (2013.01)

(58) Field of Classification Search
USPC .................. 704/258–269, 276–278
See application file for complete search history.

(56) References Cited

U.S. PATENT DOCUMENTS

| 7,200,560 | B2 | | 4/2007 | Philbert | |
|---|---|---|---|---|---|
| 7,310,605 | B2 | * | 12/2007 | Janakiraman et al. | ......... 704/277 |
| 7,386,437 | B2 | * | 6/2008 | Brulle-Drews | ................... 704/3 |
| 7,751,597 | B2 | | 7/2010 | Gabara | |
| 8,036,895 | B2 | * | 10/2011 | Kurzweil et al. | ............. 704/270 |
| 2001/0056342 | A1 | * | 12/2001 | Piehn et al. | ....................... 704/3 |
| 2010/0299134 | A1 | * | 11/2010 | Lam | ................................ 704/3 |

FOREIGN PATENT DOCUMENTS

| JP | 2004-272391 A | 9/2004 |
|---|---|---|
| KR | 10-2009-0105531 A | 10/2009 |

* cited by examiner

*Primary Examiner* — Abul Azad
(74) *Attorney, Agent, or Firm* — Cha & Reiter, LLC

(57) ABSTRACT

An apparatus for displaying an image in a portable terminal includes a camera to photograph the image, a touch screen to display the image and to allow selecting an object area of the displayed image, a memory to store the image, a controller to detect at least one object area within the image when displaying the image of the camera or the memory and to recognize object information of the detected object area to be converted into a voice, and an audio processing unit to output the voice.

20 Claims, 10 Drawing Sheets

APPARATUS AND METHOD FOR REPRESENTING AN IMAGE IN A PORTABLE TERMINAL

CLAIM OF PRIORITY

This application claims, pursuant to 35 U.S.C. §119(a), priority to and the benefit of the earlier filing date of a Korean patent application filed on Nov. 8, 2011 in the Korean Intellectual Property Office and assigned Serial No. 10-2011-0115776, the entire disclosure of which is hereby incorporated by reference.

BACKGROUND OF THE INVENTION

1. Field of the Invention

The present invention relates to an apparatus and a method for representing an image of a portable terminal, and more particularly, to an apparatus and a method for representing information of an image as a voice by distinguishing the information of the image by an object area.

2. Description of the Related Art

Generally, portable terminals have evolved into the form of a smart phone which performs various functions by using an image. A camera currently used in the portable terminal has a high resolution and a high quality image. However, the visually impaired cannot use a camera function. In general, the visually impaired may be totally blind or have limited vision capability. However, there is a growing demand for a smart phone which may be used by the visually impaired. In other words, those with limited vision capability may identify a sign and surrounding information by using a zoom feature of the camera or the totally blind may photograph an object or surroundings, and send the image of the object or surroundings to a friend to notify the friend of their situation, thus using the camera as their eyes. Therefore, a pedestrian navigation application using a camera function in the portable terminal is expected to be very useful for the visually impaired. Also, such pedestrian navigation feature may also be useful to a normal person.

SUMMARY OF THE INVENTION

The present invention has been made in view of and to solve the above problems, and provides an apparatus and a method for recognizing a character or information related to the character included in an image captured by a camera or downloaded from an external source, and for converting a recognized result into a voice to be outputted.

To this end, exemplary embodiments of the present invention include an apparatus and a method for recognizing areas having a particular function in an acquired image when a user acquires the image through a camera and converting information of the recognized areas into a voice to be guided according to a user's choice.

In accordance with an aspect of the present invention, an apparatus for displaying an image in a portable terminal includes a camera configured to photograph the image; a touch screen configured to display the image and allow selecting an object area of the displayed image; a memory configured to store the image; a controller configured to detect at least one object area within the image when displaying the image of the camera or the memory and configured to recognize object information as a character data of the detected object area to be converted into a voice; and an audio processing unit configured to output the voice.

The controller includes: an area detection unit configured to detect an area of objects included within the image; a location recognition unit configured to recognize a location of the detected area; an object recognition unit configured to recognize and convert image information of the recognized object area into a character data; and a voice conversion unit configured to convert the character data into the voice.

In accordance with another aspect of the present invention, a method for representing an image in a portable terminal includes examining whether the image is to be represented as a voice when displaying the image; detecting at least one object area of the image when the image is to be represented as the voice; displaying the image in which object areas are distinguished from one another by recognizing a location of the detected image; recognizing object information of a selected area as a character data when selecting an object area of the image; and converting the recognized character data into the voice to be outputted.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Figure 1:
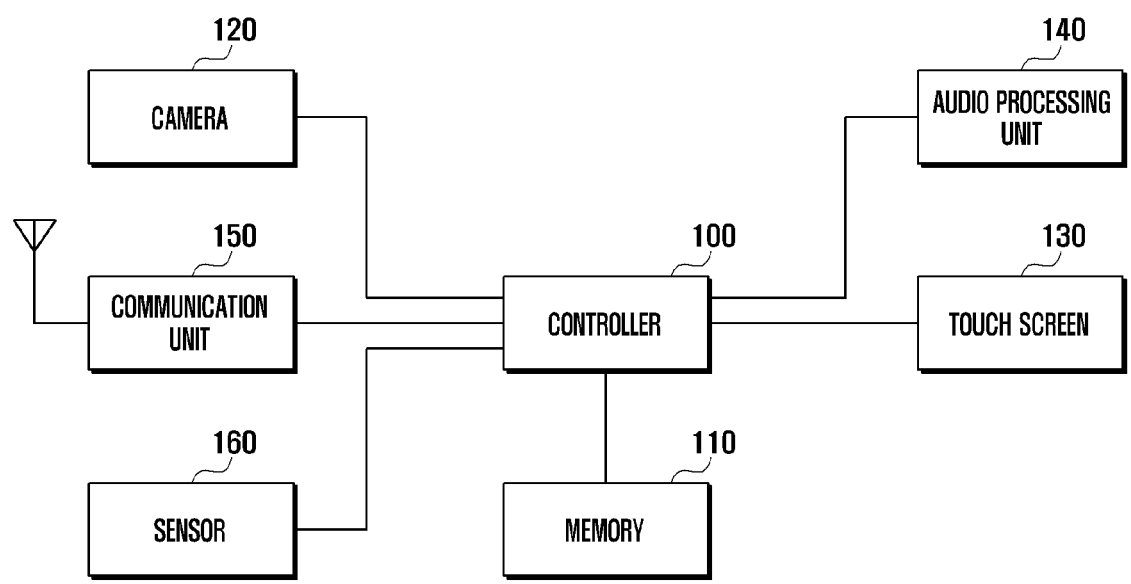
FIG. 1 is a view illustrating a configuration of a portable terminal according to an exemplary embodiment of the present invention.

Preferred embodiments of the present invention are described herein below with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. This invention may, however, be embodied in many different forms and should not be construed as limited to the exemplary embodiments set forth herein. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among terms set forth herein, data refers to any kind of information processed by the device, including text and/or images received from any external entities, messages transmitted or received, and information created when a specific function is executed by the device.

In an exemplary embodiment of the present invention, information is acquired by using a camera and converted into a voice to be outputted. In the exemplary embodiment, an image which is used for converting image information into the voice is referred to herein as a shot reader image. In the exemplary embodiment of the present invention, a camera mode includes a shot reader mode, and an image display mode includes a shot reader display mode. For example, when the camera mode is set to be in the shot reader mode, information included in an acquired image is represented as the voice when displaying the acquired image photographed by the camera according to the exemplary embodiment of the present invention. Also, when the image display mode is set as the shot reader display mode, information included in a displayed image is represented as the voice according to the exemplary embodiment of the present invention.

Also, when displaying the shot reader image according to the exemplary embodiment of the present invention, a portable terminal distinguishes and detects areas that constitute the image, recognizes information of the detected areas, and represents information according to a recognition result as the voice. Here, when a character image is included within the area, a recognition method is used to recognize the character image and to convert a recognized character into the voice to be outputted. Also, an identification symbol, referred to herein as a "symbol", within the area is, for example, a traffic sign, an entrance, or an exit, and information of each symbol is converted and represented as the voice. Here, the information of the symbol may be stored in a memory. Also, when the portable terminal does not have information of the image, the portable terminal extracts corresponding information through web searching, converts extracted web information into a form of character information, and converts the extracted web information into the voice to be outputted.

Herein, the term "object area" and "area" refer to areas having other image information within the image and the term "object information" refers to image information within the area. Also, the term "shot reader image" refers to an image stored in the camera or the memory that is recognized per object area and converted into the voice according to an exemplary embodiment of the present invention. Also, the term "shot reader image" will be interchangeably used with the term "image representable as voice."

According to the exemplary embodiment of the present invention, a configuration and an operation for converting and outputting an acquired shot reader image into a voice are described.

FIG. 1 is a view illustrating a configuration of various components of a portable terminal according to the exemplary embodiment of the present invention.

Referring to FIG. 1, a communication unit 150 performs a radio communication function with an external base station or other external devices. Here, the communication unit 150 may include or be connected to an antenna as well as a transmitter unit for performing frequency up-conversion and amplification of a transmission signal, and a receiver unit for performing low noise amplification and frequency down-conversion of a received signal. Also, the communication unit 150 may include a modulator unit and a demodulator unit. Here, the modulator unit modulates the transmission signal to be transmitted to the transmitter unit and the demodulator unit demodulates a signal received through the receiver unit. In this case, the modulator unit/demodulator unit may implement LTE, WCDMA, or GSM. Also, the modulator unit/demodulator may implement WIFI, WIBRO, NFC, or Bluetooth.

A controller 100 controls an overall operation of the portable terminal and controls operations of shot reader photographing and shot reader image display according to the exemplary embodiment of the present invention. The controller 100 may include a communication controller for controlling a communication function of the portable terminal and an application processor for controlling an execution of an application of the portable terminal. In this case, the functions and operations of the exemplary embodiment of the present invention may be performed by the application processor.

A memory 110 may include a program memory, which stores an operation program of the portable terminal and an application program implementing the exemplary embodiment of the present invention, and a data memory, which stores tables for operating the portable terminal and a data generated during execution of the operation program. In particular, the memory 110 stores a shot reader image under control of the controller 100 and stores information for converting symbol information of the shot reader image into a voice.

A camera 120 photographs the shot reader image under the control of the controller 100. A touch screen 130 may include a touch panel for detecting a user's touch input and a display unit for displaying a data and an image generated during the execution of the operation program. The touch screen 130 displays various interactions for processing the shot reader image according to the exemplary embodiment of the present invention. An audio processing unit 140 processes an audio signal of the portable terminal under the control of the controller 100. A sensor 160 detects a state of the portable terminal and may be, for example, an acceleration sensor and/or a geomagnetic sensor for detecting any physical movement and/or physical orientation of the portable terminal.

Figure 2:
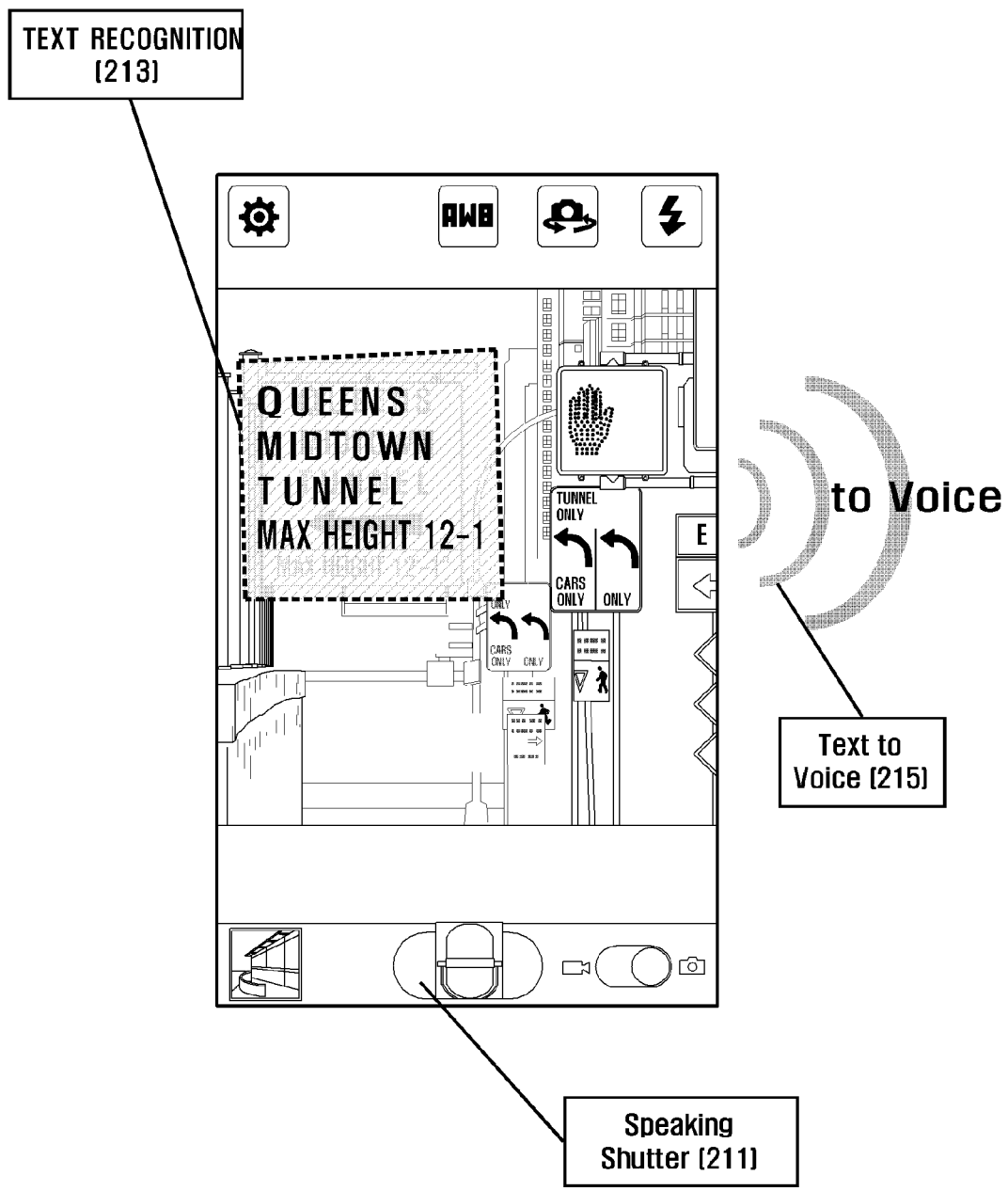
FIG. 2 is a view illustrating an example of representing object information of a shot reader image as a voice in a portable terminal according to the exemplary embodiment of the present invention.

FIG. 2 is a view illustrating an example of a shot reader image according to the exemplary embodiment of the present invention.

In a shot reader photographing mode, the controller 100 displays an icon such as a speaking shutter icon 211 on the touch screen 130. Here, the icon 211, which is an icon for displaying the shot reader image photographing mode, is different from an icon for a general camera mode. In the exemplary embodiment of FIG. 2, the icon 211 of the shot reader photographing mode displays a microphone to indicate that a photographed image is also represented as a voice.

When the icon 211 is touched, the controller 100 obtains an image photographed by the camera 120, recognizes a character image 213 included in the acquired image, for example, by text recognition of characters in the image using text recognition methods known in the art, and converts the recognized character image and associated text into the voice, which is output as audio 215 in the form of text-to-voice using text-to-voice generation methods known in the art. For example, in the shot reader image photographing mode, a character image and a symbol image included in the acquired image are converted into the voice to be represented.

Figure 3:
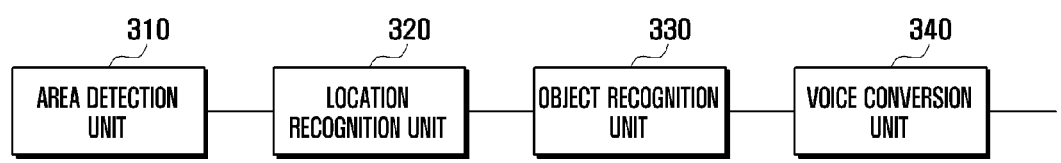
FIG. 3 is a view illustrating a configuration for converting an image obtained by a controller into a voice according to the exemplary embodiment of the present invention.

FIG. 3 is a view illustrating a configuration for converting an image obtained by the controller 100 according to the exemplary embodiment of the present invention.

Referring to FIG. 3, an area detection unit 210 detects areas included in the shot reader image. Here, the areas may be object areas located within the image and the object areas may be configured as a character and/or a symbol. Here, the area detection unit 210 may detect the area by extracting a contour of each of the object areas and/or analyzing a boundary of a color, using area detection methods known in the art.

A location recognition unit 320 recognizes locations of the detected object areas within the image, for example, according to pixel coordinates on an x-y plane of the displayed image, using location recognition methods known in the art. The location recognition unit 320 recognizes locations of the areas within the shot reader image and generates location information of each of the object areas according to a recognition result.

An object recognition unit 330 performs a function to recognize the character image and the symbol image within each of the object areas recognized by the location recognition unit 320 and to convert the recognized character image and the symbol image into a character data. Here, the object recognition unit 330 may be implemented by using an optical character recognition (OCR) function, in a manner known in the art. Also, when the image within the object area is a symbol, the object recognition unit 330 may identify information stored in the memory 110 to generate symbol character information. Also, the object recognition unit 330 may identify information within the object area through web searching.

A voice conversion unit 340 performs a function to convert the object character information recognized by the object recognition unit 330 into the voice to be outputted. Here, the voice conversion unit 340 may be implemented by using a text to speech (TTS) function using TTS methods known in the art.

A user of the portable terminal may set a shot reader image mode in a setting mode. For example, when the user selects the setting mode from a menu of the portable terminal and selects an accessibility/shot reader function in the setting mode, the controller 100 performs a shot reader image display function according to the exemplary embodiment of the present invention in a photograph mode or an image display mode of the camera 120. Herein, the following description will be made with respect to processing the shot reader image photographed by the camera 120.

Figure 4A:
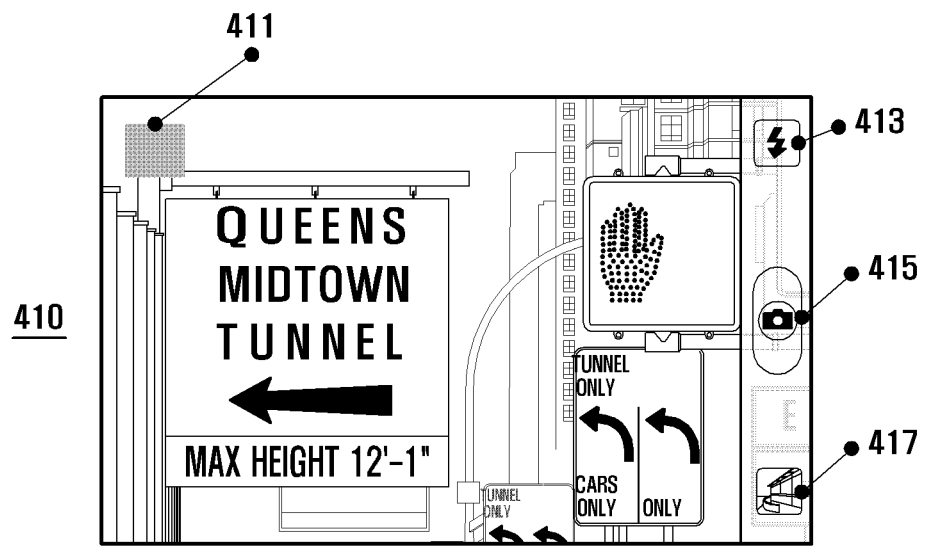
FIGS. 4A-4C are views illustrating example screens displayed in a shot reader function according to the exemplary embodiment of the present invention.
Figure 4B:
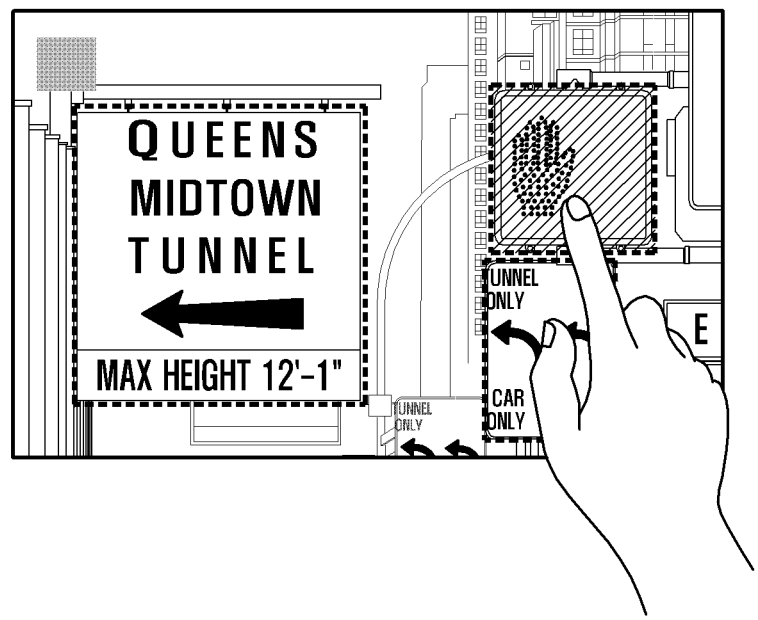
Figure 4C:
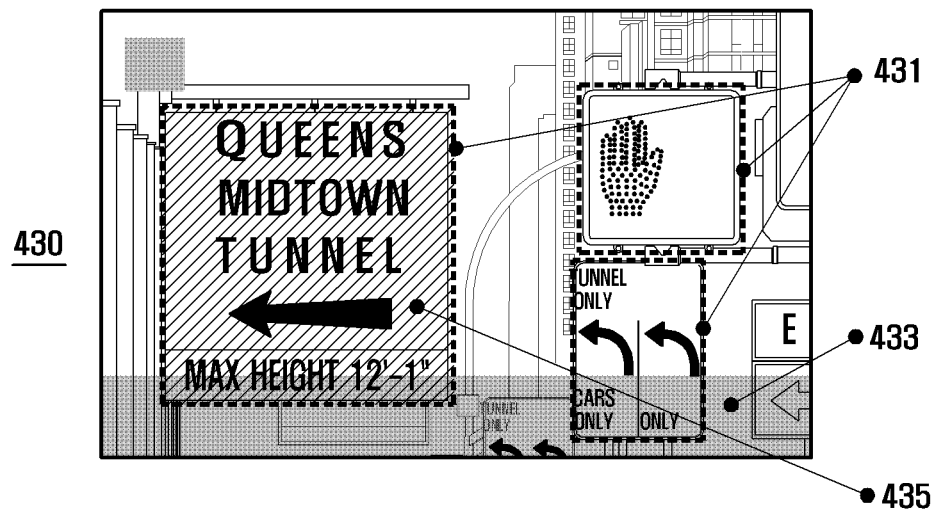

When the shot reader function is set, the controller 100 displays, on the touch screen 130, the image photographed by the camera 120 as shown in the example screens in FIGS. 4A-4C. FIGS. 4A-4C are views illustrating example screens displayed in a shot reader function according to the exemplary embodiment of the present invention.

When an image is acquired through the camera 120, the controller 100 displays the acquired image 410 on the touch screen 130, as shown in FIG. 4A. Here, the controller 100 displays a horizontal alignment status icon 411 to overlap with the image photographed by the camera 120 and displays soft button display icons including a flash button 413, a shutter button 415, and a quick view button 417. Here, when a horizontal alignment of the image is out of a range of the object areas for recognition, the horizontal alignment status icon 411 alerts the user by changing a color of the icon to a different color, for example, red. Also, regarding a configuration of a soft button, the flash button 413 is driven independently of a camera flash and turns on/off a flash according to a user's touch when photographing an image. A shutter button 415 is a button for photographing the shot reader image. When the shutter button 415 is touched, the controller 100 performs a function to convert the image to the voice according to the present invention. The quick view button 417 is a button for displaying a list of the shot reader image.

When the shutter button 415 is touched, the controller 100 detects the object areas included in an image 410, and displays such object areas in modified screens of the touch screen 130, as shown in the images 420, 430 illustrated in FIGS. 4B-4C, respectively. Here, detecting the object areas is performed by the area detection unit 310 and the location recognition unit 320 recognizes the location information of the detected object areas. Here, at least one object area 431 may be displayed, as shown in the image 430 in FIG. 4C, and may be displayed such that a boundary of each object area 431 is represented as a box having a color different from the object image 430. Also, the user may select each object area 431 within the photographed image to be represented as the voice. Here, a method of selecting the respective object areas may include, as shown in the image 420 of FIG. 4B, selecting by directly touching a specific object area by the user. Also, the object areas 431 may be selected by, as shown in the image 430 of FIG. 4C, displaying a virtual pad 433 to overlap the image 430 and performing a flick operation on the virtual pad 433. Also, display of the virtual pad 433 may be determined in the setting mode and, when displaying the virtual pad 433, the virtual pad 433 is overlaid on the image 430 after processing of the image 430 is finished. Also, when a specific object area 435 is selected by using the touch or Tap gesture on the object or the virtual pad 433, the controller 100 highlights the touched object area as shown in the image 420 and/or in the virtual pad 433 of the image 430 in FIG. 4C. FIG. 4C is views illustrating example when shutter is pressed with virtual pad ON (431: indicator box of the recognized object or text. 433: virtual pad for moving focus; Virtual pad can be enabled in settings (OFF as default); Virtual pad pops up when image processing is timed out. 435: The leftmost object gets highlighted (focused) as default after TTS reads through all the recognized objects first.)

Figure 5:
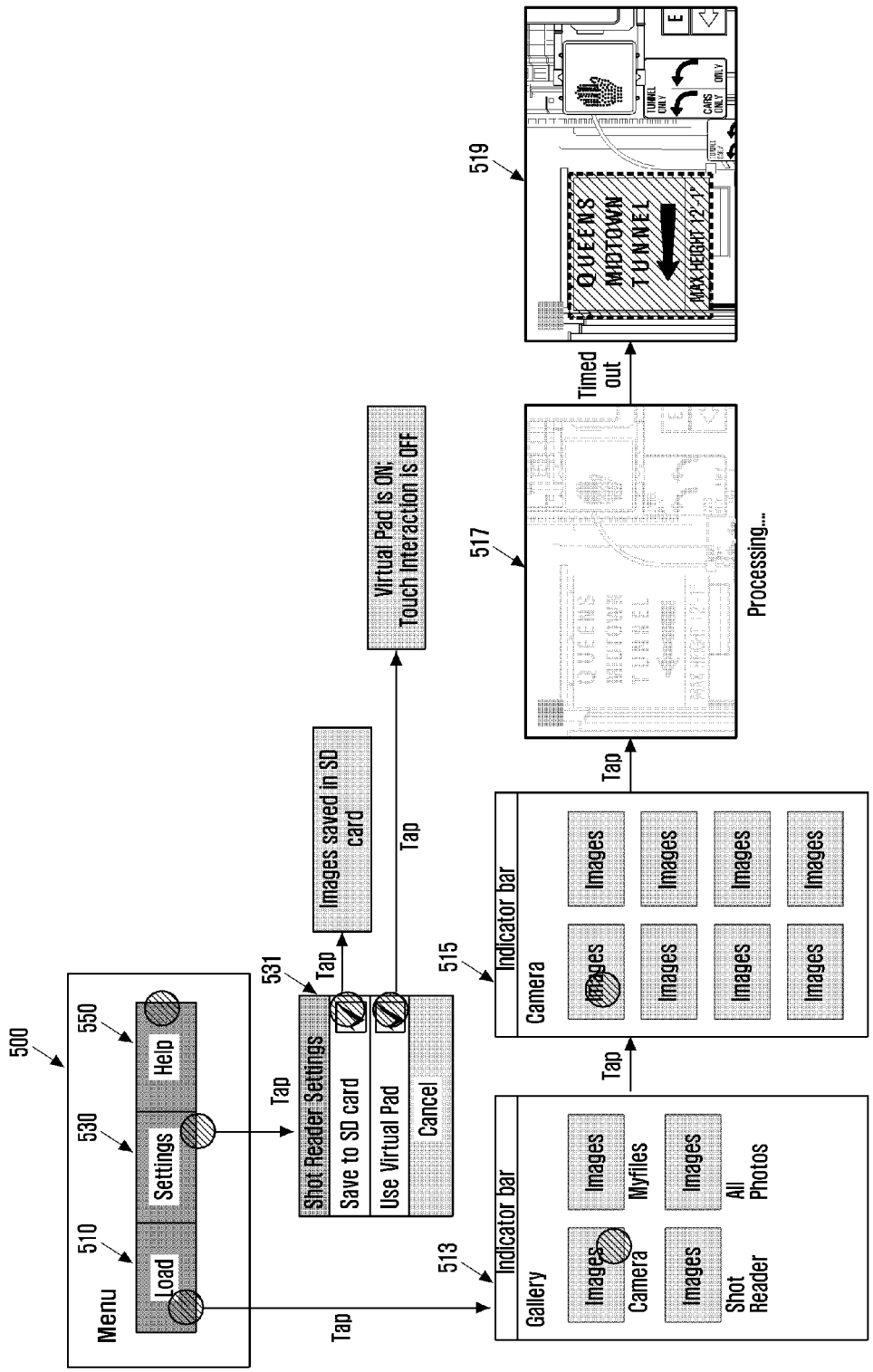
FIG. 5 is a view illustrating a configuration of menus in a portable terminal according to the exemplary embodiment of the present invention.

FIG. 5 is a view illustrating a configuration of menus in a portable terminal according to the exemplary embodiment of the present invention.

Referring to FIG. 5, the user may select the shot reader images stored in the memory 110 from a menu 500, and set whether to store the shot reader image and whether to display the virtual pad. In the menu 500, a load button 510 may allow selecting the image stored in the memory 110, a settings button 530 may allow a user to set whether to use the shot reader image and the virtual pad, and a help button 550 activates display of a menu for explaining an operation in a shot reader mode.

When the settings button 530 is selected, for example, by a Tap gesture, from the menu 500, setting the memory 110 for storing the shot reader image and setting whether to use the virtual pad are enabled, as shown in the displayed window 531. Here, when a Secure Digital (SD) card is selected, shot reader images generated thereafter are stored in the SD card, which may be connected to or included in the portable terminal of FIG. 1, or alternatively which may be included in or connected to the memory 110. Also, if the virtual pad is selected, the virtual pad is overlaid on the image displayed on the touch screen 130; for example, as shown in FIG. 4C. Here, when selecting the object area in the shot reader image, the portable terminal may be set such that the touch operation is not performed when the virtual pad is turned on. For example, the portable terminal may be set such that a touch on the object area is not to be processed when the virtual pad is turned on. Also, the virtual pad and a touch operation may be set to be performed independently of each other.

Also, when the load button 510 in the menu 500 is selected, an image category stored in the memory, as shown in the window 513, is displayed on the touch screen 130. Here, when the shot reader image is selected in the image category in the window 513, for example, by a Tap gesture, the shot reader images are displayed in a window 515 and, when a particular image is selected in the window 515 by a Tap gesture, the selected shot reader image is displayed as in a window or screen 517. Here, when performing a display operation as shown by the generation and display of the window 515, the controller 100 detects the object areas within the selected image in the window 517 and recognizes the location of the object areas in the selected image. Next, after detecting the object areas and locations thereof, the controller 100 displays the detected object areas, as in the window or screen 517. Here, the controller 100 may recognize object information of each of the object areas by character and symbol recognition or web searching, convert the recognized information of the objects into the voice to be outputted, and select the object areas according to a user's choice. Here, the TTS function may be omitted in a step of displaying the image as the window or screen 517. In this case, the controller 100 may detect the object areas in the selected image, corresponding to the saved images of the Camera folder, represented by the Tap on the circle over the Camera image folder icon in the window 513, perform an operation of recognizing the locations of the object areas, and display the detected object areas, as in the window or screen 517, after detecting the object areas and recognizing the location thereof. The TTS function may be performed only with respect to the object information selected by the user by a touch or a flick on the virtual pad.

However, if no object areas are detected and/or no locations of detected objects in the image of the window or screen 517 are found after a predetermined time-out period, the operation of recognizing the locations times out, and the portable terminal displays the original selected image in a screen 519, as shown in FIG. 5. (519: TTS reads through all the recognized items first Focus moves accordingly when TTS reads through all the recognized items first.)

Figure 6:
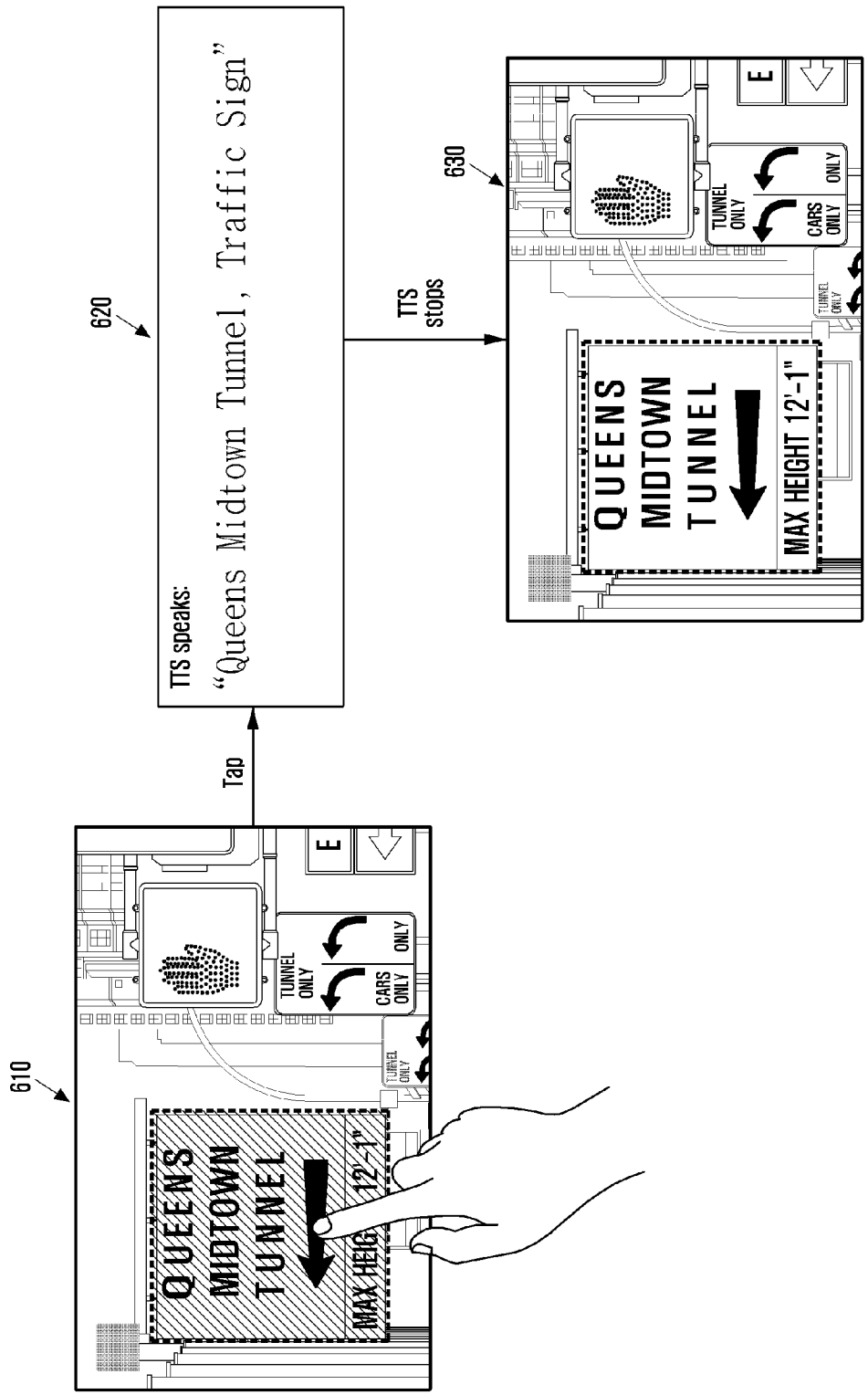
FIG. 6 is a view illustrating an example of recognizing object information of a selected area where a shot reader image is displayed and outputting the object information as a voice according to the exemplary embodiment of the present invention.

FIG. 6 is a view illustrating an example of recognizing object information of a selected area where a shot reader image is displayed and outputting the object information as a voice according to the exemplary embodiment of the present invention.

Referring to FIG. 6, when displaying the shot reader image acquired by the camera 120 or the shot reader image stored in the memory 110, the controller 100 may convert information of the object area selected by the user into the voice to be outputted. When the shot reader image 610 is displayed and the user touches a specific object area in the shot reader image 610 or selects the specific object area by using the virtual pad, for example, by performing a Tap gesture, the controller 100 detects the Tap gesture and highlights the selected object area on the touch screen 130. In FIG. 6, the shot reader image 610 corresponds to the case where the user touches or taps the object area, which is then highlighted and/or changes color, for example, as shown by the cross-hatching of the displayed icon with an object area corresponding to the Queens Midtown Tunnel traffic sign in the shot reader image 610.

Next, the controller 100 recognizes the information of the selected object area to be converted into the character data and converts the converted character data into the voice, represented by the output TTS message 620, such as "Queens Midtown Tunnel, Traffic Sign", to be outputted through the audio processing unit 140. Here, a method of recognizing the information of the object area includes, in the case of the character image, recognizing and converting a character into the character data and, in the case of the symbol, searching symbols stored in the memory 110 to access a character data of a corresponding symbol. Also, when the object information is not the character image or the image stored in the memory 110, the controller 100 may identify corresponding object information through web searching and convert the identified information to the character data.

As above, after converting the information of the object area selected by the user within the image into the voice to be outputted, the controller 100 terminates highlighting the selected object area, as shown in the image 630, and stands by for a next state.

Figure 7:
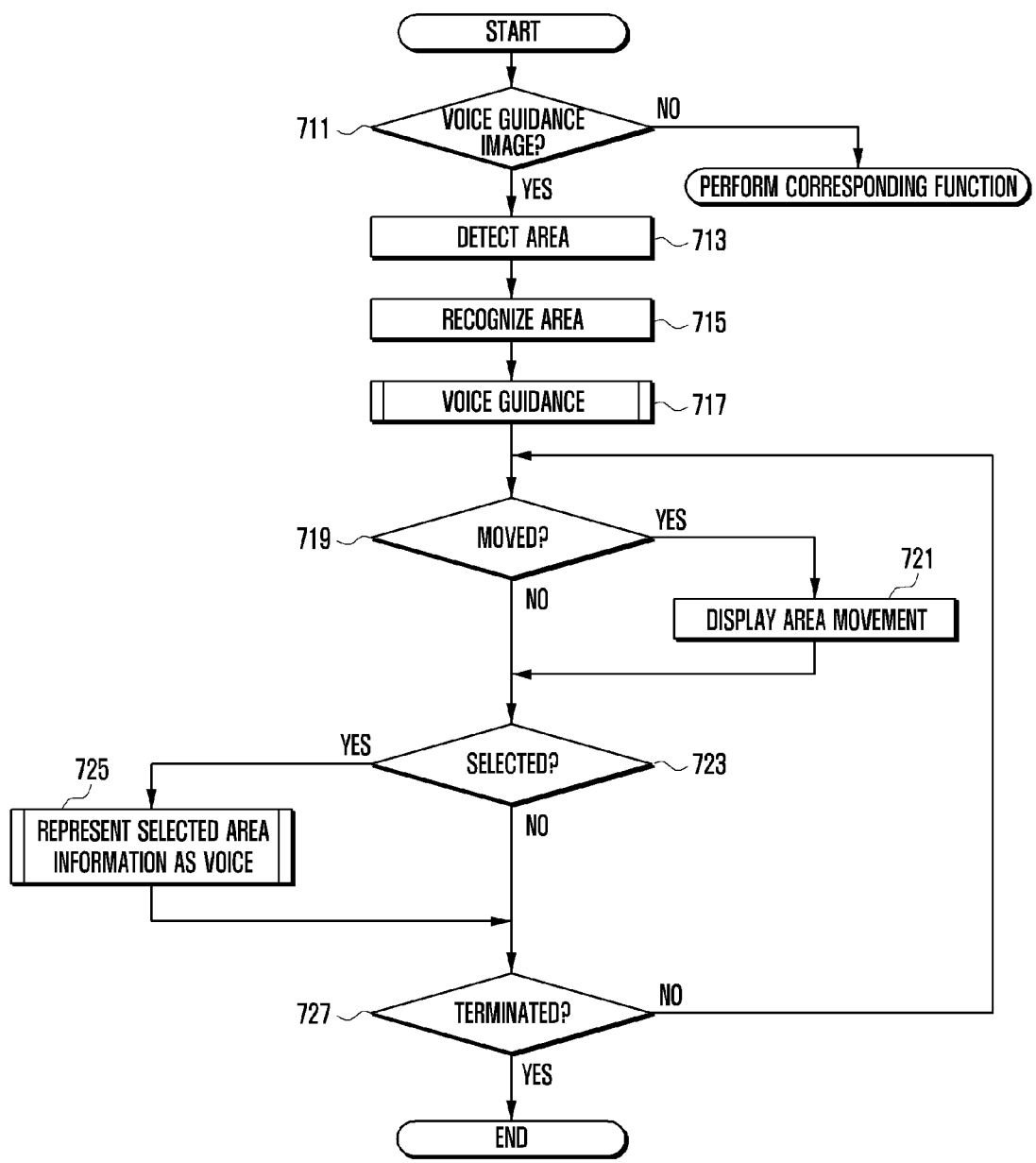
FIG. 7 is a flow chart illustrating a process of recognizing object areas of a shot reader image of a portable terminal and converting object information of the recognized object area to be outputted as a voice according to the exemplary embodiment of the present invention.

FIG. 7 is a flow chart illustrating a procedure of processing a shot reader image according to the exemplary embodiment of the present invention.

Referring to FIG. 7, when displaying an image, the controller 100 examines whether the image is the shot reader image that performs voice guidance in step 711. Here, the shot reader image may be an image photographed by the camera 120 in the shot reader mode or an image stored in the memory 110 as the shot reader image. If the image is not a shot reader image, such that voice guidance is not provided, the method performs a corresponding or different function of the portable terminal. Otherwise, if the image requires voice guidance in step 711, for example, to generate a voice from the shot reader image, the controller 100 detects the object areas within the shot reader image in step 713. Here, an area detection method may be set as, for example, a method of detecting a contour within the image and/or a method of using a color difference. For example, block images having one or more meanings may exist within the shot reader image. In FIG. 2, three object areas exist, as shown in greater detail by the object areas 431 of the image 430 of FIGS. 4A-4C. In this case, the controller 100 detects the object areas within the shot reader image in step 713 and recognizes locations of the detected object areas in step 715. Here, the reason for recognizing the location information is to move a unit of the object area and/or identify image information within a corresponding object area when the user selects a particular object area by using the virtual pad or a touch to an icon or an object area on the touch screen 130. As described above, when detecting the object areas within the shot reader image and recognizing the locations thereof, the controller 100 may display each detected object area on the shot reader image displayed on the touch screen 130.

Figure 8:
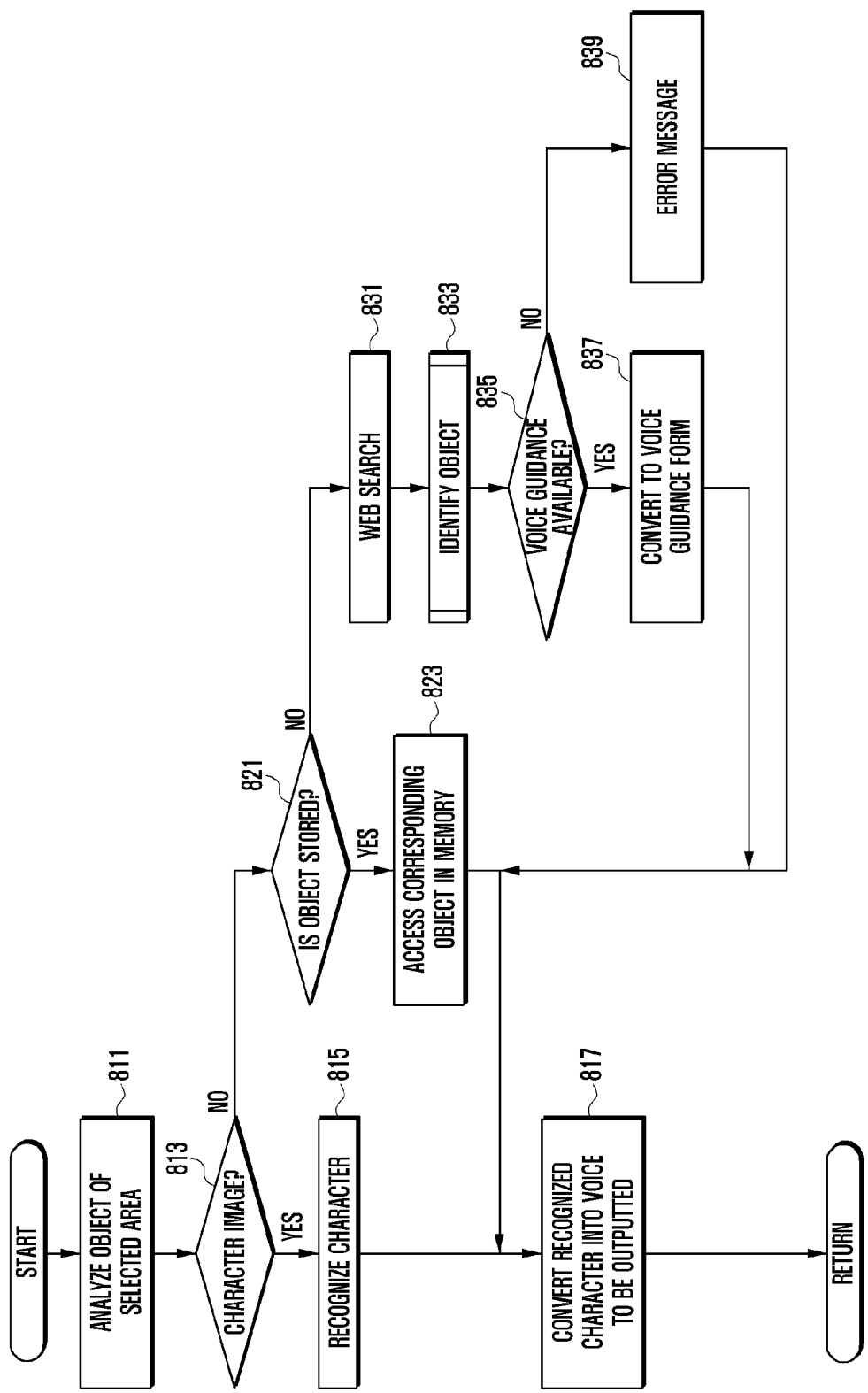
FIG. 8 is a flow chart illustrating a process of recognizing and converting information of an object area into a voice in FIG. 7.

After recognizing the location of the object area as described above, the controller 100 performs an operation of recognizing as a character data and converting information of the object area into a voice for voice guidance in step 717. FIG. 8 is a flow chart illustrating a process of recognizing and converting information of an object area into a voice for voice guidance in step 717 in FIG. 7.

Referring to FIG. 8, first, the controller 100 analyzes the detected object areas in step 811. Here, when the information of the object area is the character image, the controller 100 first detects that such information is a character image in step 813 and recognizes and converts the character image into the character data in step 815 and proceeds to step 817. However, in step 813, when the object information is not the character image, the controller 100 searches the memory 110 to determine whether the object information is stored in the memory 110 in step 821. Here, the object information stored in the memory 110 may be a character, a symbol, a Universal Resource Locator (URL), etc. In this case, the controller 100 accesses the character data of the object information stored in the memory 110 in step 823 and proceeds to step 817.

However, in step 821, when the object information is not the character image and is not stored in the memory 110, web searching for such object information is performed in step 831. In an alternative embodiment, the web searching may be an option set by the user, and when the web searching is not set, steps 831 to 839 may be omitted. In a further alternative embodiment, the controller 100 may display whether to perform web searching as a query to the user displayed on the touch screen 130 in step 831. When the user stops executing the web searching, the controller 100 may skip steps 831 to 839. Otherwise, in the exemplary embodiment of the present invention, when the web searching is set, the controller 100 automatically performs web searching in step 831. In this case, when the object information is a URL, a corresponding web site may be directly accessed for searching. Also, if the object information is a particular name; for example, a personal name and/or address, the web searching may be performed according to a preset user setting. After performing the web searching in step 831, the object information is identified in step 833, and the controller 100 determines whether the object information may enable voice guidance in step 835. Here, if the object information may enable voice guidance such that voice guidance is available, the object information is converted into a character message in the form of a voice for voice guidance in step 837, and if voice guidance is not available in step 835, the object information is converted into an error message in the form of the character data and displayed in step 839. After either of steps 837 or 839, the method proceeds to step 817.

As described above, the object information of each detected area within the shot reader image is recognized and converted into the character data, and the controller 100 converts the object information of each area into the voice to be outputted in step 817. The method then proceeds to step 719 in FIG. 7.

Next, when the user indicates movement of the object area on the touch screen 130 through, for example, the virtual pad, the controller 100 detects such movement in step 719 and displays the moved object area in step 721. The method then proceeds to step 723. However, if no movement is indicated or detected in step 719, the method proceeds directly to step 723. In step 723, if the user does not select a displayed object area, the method proceeds to step 727 to detect for a termination command. Otherwise, when the user selects the displayed object area through the virtual pad or touch by the user, the controller 100 detects such a selection in step 723, recognizes the information of the selected object area into the character data in step 725, and converts the recognized character data into the voice to be outputted. For example, when a particular object area is touched on the screen 610 shown in FIG. 6, the controller 100 analyzes the information of the touched or selected object area. Here, in the case of the character image, the controller 100 performs steps of 815 and 817 of FIG. 8 to recognize the character image as the character data and to convert the recognized character data into the voice to be outputted. Also, in the case of the object information stored in the memory 110, the controller 100 performs steps 823 and 817 to access the character data corresponding to the object information in the memory 110 and to convert the character data into the voice to be outputted. Also, when the web searching is needed, the controller 100 performs steps 831 to 839 and 817 to convert information searched by the web search into the voice to be outputted.

While performing the above operation to perform step 725, the information of the object area within the shot reader image is recognized as the character data and converted into and outputted as the voice, and then, when the user generates a termination command, the controller 100 detects entry of the termination command, and terminates the shot reader image display in step 727. However, in step 727, if no termination command is entered, the method loops back to step 719.

Here, in step 717 of FIG. 7, which is shown in greater detail in FIG. 8, information of each of the object areas within the shot reader image, which is displayed when displaying an initial shot reader image on the touch screen 130, is converted into the character data and again converted into the voice to be outputted. However, step 717 of FIG. 7 may be omitted. In this case, the operations and functions at steps 719 to 725 may be performed only while converting information of the object area, according to the user's choice, into the voice.

As described above, the portable terminal according to the present invention may set a shot reader image display mode in the setting mode. When the shot reader image display mode is set and the user photographs the shot reader image through the camera 120 or displays the shot reader image stored in the memory 110, the controller 100 detects the object areas within the shot reader image, recognizes the location of the object areas, recognizes object information of the recognized area, and converts the object information into the voice to be outputted.

Here, examples of representing the shot reader image may include reading a sign, reading a bulletin, and recognizing a face. First, in the case of sign reading, when the shot reader image is photographed by using the camera 120 on a street or in a stopped car, the portable terminal converts information of the image into the character data and converts the character data into the voice to be represented as the voice. Here, when a phone number is included within the shot reader image, a call origination function may be performed by using a call origination button or command of the portable terminal. Also, in the case of bulletin reading, the user may photograph an image of useful information such as, for example, a subway map or a road sign as the shot reader image and represent information of the photographed image as a voice, thereby identifying and determining information without receiving assistance from another person. Also, in the case of face recognition, a face of a person located a distance away may be photographed by using a zoom feature and compared with a face stored in the memory 110 such as, for example, a face of a person stored in a phonebook of the portable terminal or a registered face to confirm an identity of the person. The functions described above, provided by the present invention, may be useful for the visually impaired.

In a method and an apparatus for representing an image of a portable terminal according to the exemplary embodiment, a shot reader image representation mode is provided for representing an image and converting the image or objects in the image into a voice, such that each object area within the image is detected to recognize a location thereof when displaying the image, and image information of a corresponding object area is converted to a character data when a user selects an object area, and the character data is converted to the voice to be outputted. Therefore, an image photographed by the camera may be utilized by a pedestrian navigation function and may be serviced by various applications when a high resolution camera is provided. In particular, for the visually impaired, a specialized camera function may be provided to efficiently perform, for example, direction guidance.

The above-described apparatus and methods according to the present invention can be implemented in hardware, firmware or as software or computer code that can be stored in a recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus for displaying an image in a portable terminal, the apparatus comprising:
    a camera configured to photograph an image;
    a touch screen configured to display the image and allow selecting of an object area of the displayed image;
    a memory configured to store the image;
    a controller configured to detect the object area within the image when displaying the image from the camera or the memory, and configured to recognize object information of the detected object area as a character data to be converted into a voice; and
    an audio processing unit configured to output the voice,
    wherein the controller is further configured to perform, if the recognized object information is not a character image and an image stored in the memory, a web search for the object information and convert information identified by the web search into the character data.

2. The apparatus of claim 1, wherein the controller comprises:
    an area detection unit configured to detect an area of the object included within the image;
    a location recognition unit configured to recognize a location of the detected area within the image;
    an object recognition unit configured to recognize and convert image information of the detected object into a character data; and
    a voice conversion unit configured to convert the character data into the voice.

3. The apparatus of claim 2, wherein the object recognition unit includes an optical character recognition (OCR) engine for converting a character image of the object information to the character data.

4. The apparatus of claim 3, wherein the controller displays a virtual pad overlapping the displayed image and displays movement of the object area by a flick on the virtual pad.

5. The apparatus of claim 4, wherein, when a touch on the touch screen is detected, the controller converts information of the object area at a detected touch location into the character data and converts the converted character data into the voice.

6. A method for representing an image in a portable terminal, the method comprising:
    detecting whether the image is to be represented as a voice when displaying the image;
    detecting a plurality of object areas of the image when the image is to be represented as the voice;
    displaying the image in which each of the object areas are distinguished from at least one other object area by recognizing a location of each object area within the displayed image;
    recognizing object information of a selected object area as a character data when receiving the selection of the object area of the image; and
    converting the character data into the voice to be outputted,
    wherein the recognizing of the object information comprises performing, if the recognized object information is not a character image and an image stored in memory, web search for the object information and converting information identified by the web search into the character data.

7. The method of claim 6, wherein the recognizing the object information as the character data includes:
    converting a character image of the object information into the character data.

8. The method of claim 6, wherein the recognizing the object information as the character data includes:
    converting the character image into the character data when the object information is the character image; and
    accessing the character data in the memory when the object information is stored in the memory.

9. The method of claim 8, after displaying the image in which each of the object areas are distinguished from at least one other object area, further comprising:
    analyzing information of the object areas;

converting the character image into the character data when the object information is the character image;

accessing the character data in the memory when the object information is stored in the memory; and outputting in sequence the character data of the object areas as a voice.

10. The method of claim 8, further comprising:

displaying a virtual pad overlapping the displayed image and displaying movement of the object areas by a flick on the virtual pad.

11. A non-transitory recording medium readable in a computing device, in which an executable program is recorded thereon, the program when accessed by a processor causes the processor to execute the steps of:

detecting whether an image from a camera in a portable terminal is to be represented as a voice when displaying the image;

detecting a plurality of object areas of the image when the image is to be represented as the voice;

displaying the image in which each of the object areas are distinguished from at least other object area by recognizing a location of each object area within the displayed image;

recognizing object information of a selected object area as a character data when receiving the selection of the object area of the image; and converting the character data into the voice to be outputted, wherein the recognizing of the object information comprises performing, if the recognized object information is not a character image and an image stored in memory, web search for the object information and converting information identified by the web search into the character data.

12. The non-transitory recording medium of claim 11, wherein the recognizing the object information as the character data includes:

converting a character image of the object information into the character data.

13. The non-transitory recording medium of claim 11, wherein the recognizing the object information as the character data includes:

converting the character image into the character data when the object information is the character image;

accessing the character data in the memory when the object information is stored in the memory.

14. The non-transitory recording medium of claim 13, after displaying the image in which each of the object areas are distinguished from at least one other object area, further comprising:

analyzing information of the object areas;

converting the character image into the character data when the object information is the character image;

accessing the character data in the memory when the object information is stored in the memory; and outputting in sequence the character data of the object areas as a voice.

15. The non-transitory recording medium of claim 13, further comprising:

displaying a virtual pad overlapping the displayed image and displaying movement of the object areas by a flick on the virtual pad.

16. The non-transitory recording medium of claim 11, further comprising:

receiving the selection of the object area on a touch screen of the portable terminal.

17. The non-transitory recording medium of claim 11, further comprising:

recognizing the location of each object area within the displayed image using a location recognition unit.

18. The non-transitory recording medium of claim 11, wherein the converting the character data into the voice includes:

using a text-to-speech method applied to the character data.

19. The non-transitory recording medium of claim 11, wherein the recognizing of object information includes:

accessing a symbol in a memory corresponding to the character data.

20. A portable terminal comprising:

a camera configured to photograph an image;

a touch screen configured to display the image and allow selecting of an object area of the displayed image;

a memory configured to store the image;

a controller configured to detect the object area within the image when displaying the image from the camera or the memory, and configured to recognize object information of the detected object area as a character data to be converted into a voice; and an audio processing unit configured to output the voice, wherein the controller is further configured to perform, if the recognized object information is not a character image and an image stored in the memory, a web search for the object information and convert information identified by the web search into the character data.

* * * * *